(12) United States Patent
Zhou et al.

(10) Patent No.: US 10,107,978 B2
(45) Date of Patent: Oct. 23, 2018

(54) OPTICAL MODULE AND ASSEMBLY METHOD THEREOF

(71) Applicant: InnoLight Technology (Suzhou) LTD., Suzhou, Jiangsu (CN)

(72) Inventors: Xian Zhou, Jiangsu (CN); Kewu Wang, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 15/470,094

(22) Filed: Mar. 27, 2017

(65) Prior Publication Data
US 2017/0315315 A1    Nov. 2, 2017

(30) Foreign Application Priority Data
Apr. 28, 2016   (CN) .......................... 2016 1 0279831

(51) Int. Cl.
  *G02B 6/036*   (2006.01)
  *G02B 6/42*    (2006.01)
  *G02B 6/38*    (2006.01)

(52) U.S. Cl.
  CPC ......... *G02B 6/4277* (2013.01); *G02B 6/3897* (2013.01); *G02B 6/428* (2013.01); *G02B 6/4257* (2013.01)

(58) Field of Classification Search
  CPC .................................................. G02B 6/4277
  See application file for complete search history.

(56) References Cited

U.S. PATENT DOCUMENTS

| | | | | |
|---|---|---|---|---|
| 7,125,261 B2* | 10/2006 | Yoshikawa | .......... | G02B 6/4201 385/92 |
| 7,406,230 B2* | 7/2008 | Yoshikawa | .......... | G02B 6/4201 385/14 |
| 8,967,884 B2* | 3/2015 | Kondou | ............... | G02B 6/4245 385/92 |

* cited by examiner

*Primary Examiner* — Sung Pak
(74) *Attorney, Agent, or Firm* — Finnegan, Henderson, Farabow, Garrett & Dunner, LLP (57) ABSTRACT

An optical module includes: an optical assembly, including a light receiving assembly and/or a light transmitting assembly; a printed circuit board, on which the optical assembly is mounted; an adapter, used for docking with external connectors, wherein the adapter is configured to fit the optical assembly and to be fixed to the printed circuit board, and the adapter includes a metal part and a plastic part; and a conductive shell, used for accommodating the printed circuit board, the optical assembly, and the adapter, the conductive shell being electrically connected to the metal part of the adapter.

13 Claims, 6 Drawing Sheets

OPTICAL MODULE AND ASSEMBLY METHOD THEREOF

CROSS-REFERENCE TO RELATED APPLICATIONS

This application is based upon and claims the benefit of priority from prior Chinese Patent Application No. 201610279831.6 filed on Apr. 28, 2016, the entire contents of which are incorporated herein by reference.

FIELD OF THE DISCLOSURE

The present application belongs to the technical field of optical communication, and specifically relates to an optical module and assembly method thereof.

BACKGROUND

An optical module includes an optical portion, an electrical portion, and a mechanical structural portion. The optical portion includes a light transmitting assembly, a light receiving assembly, and so forth. The electrical portion includes a circuit board, and so forth. The mechanical structural portion includes a case and an adapter. The primary function of an optical module is to carry out photoelectric conversion. Electrical signals are converted into optical signals at a sending terminal, and optical signals are converted into electrical signals at a receiving terminal, thereby enabling transmission of information.

Figure 1A:
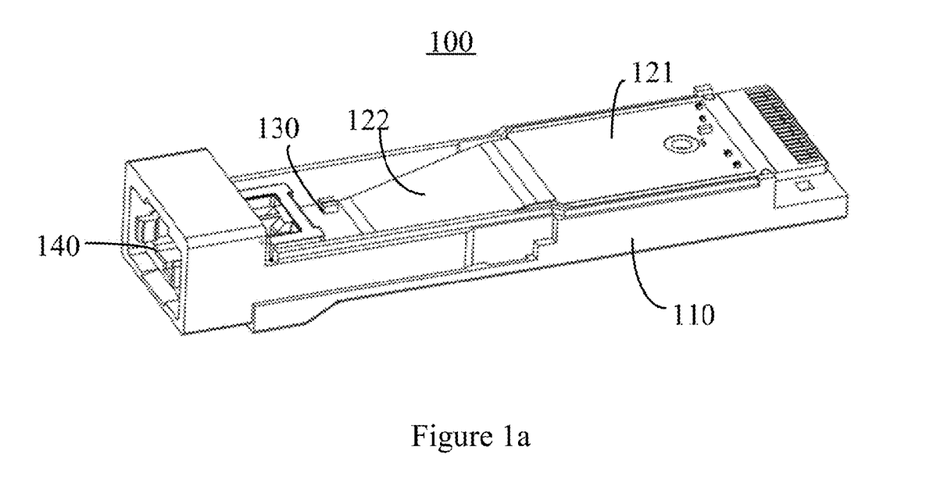
FIGS. 1a and 1b are schematic diagrams showing the 3D structure and an exploded view of an optical module.
Figure 1B:
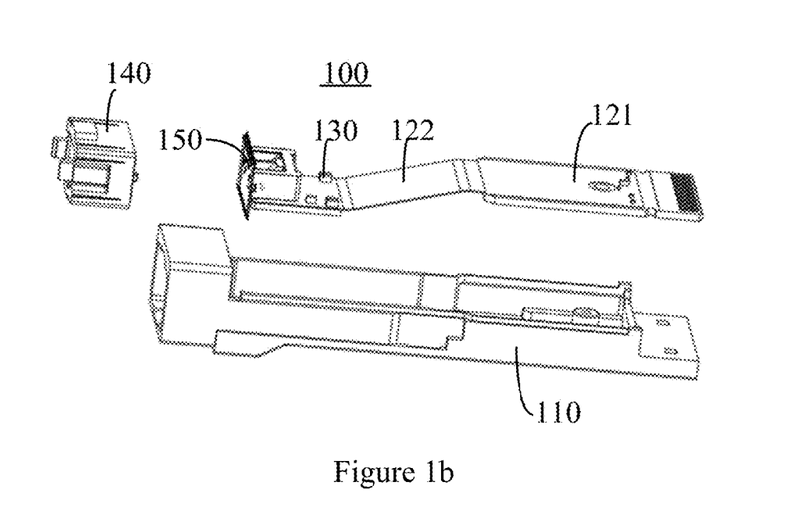

FIGS. 1a and 1b show an optical module 100, which includes: a shell 110, a Printed Circuit Board Assembly (PCBA) circuit board 121 and a flexible circuit board 122 arranged in the shell 110, an optical assembly 130 disposed on the flexible circuit board 122, a plastic adapter 140 configured to fit the optical assembly 130, and a metal spring piece 150 arranged between the plastic adapter 140 and the optical assembly 130 for electromagnetic shielding. The optical module 100 has the following deficiencies:

In optical module 100, an optical portion (optical assembly 130) and an electrical portion (PCBA circuit board 121) are connected by means of the flexible circuit board 122 or a fiber optic patch cord, resulting in weak structural strength, high cost of rigid-flex circuit boards, complex optical manufacturing process, and low yield.

The flexible circuit board 122 can flexibly change its shape, impacting the positional accuracy of optical devices at a shell interface, thus impacting the optical and electrical performance of the optical module 100.

The thin metal spring piece 150 is used for electromagnetic shielding. Its structure is complex, and it demonstrates poor contact with the shell 110 and weak structural strength, resulting in poor electromagnetic shielding effectiveness.

Figure 2:
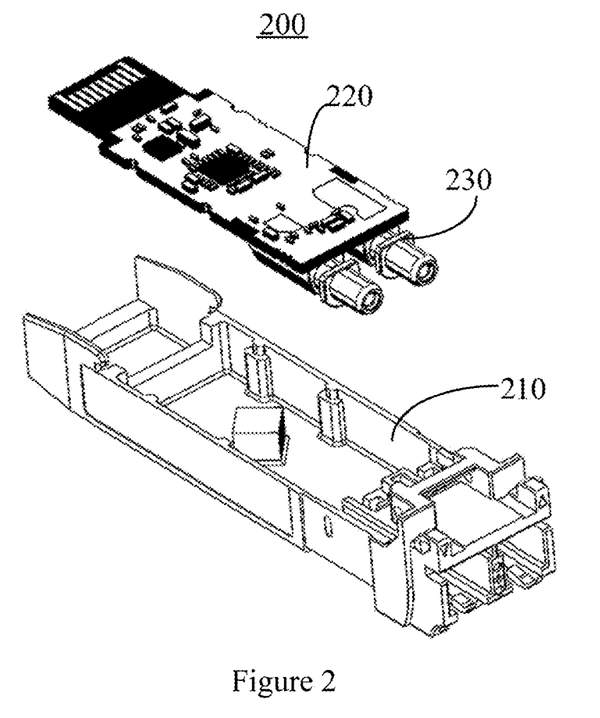
FIG. 2 is a schematic diagram showing an exploded view of another optical module.

FIG. 2 shows another optical module 200, which includes: a shell 210, a printed circuit board 220 arranged in the shell 210, and an optical assembly 230 disposed on the printed circuit board 220. The optical assembly 230 is mounted directly on the printed circuit board 220. The entire unit of the optical assembly 230 and the printed circuit board 220 is assembled into the shell 210. Components for securing the printed circuit board 210 are arranged on the shell 210. In the optical module 200, however, problems with respect to the mounting accuracy of the optical assembly 230 and the accuracy of the shape, thickness, and other dimensions of the printed circuit board 220 will result in displacement when the unit containing the optical assembly 230 and the printed circuit board 220 is assembled into the shell 210, and the optical assembly 230 will undergo stress, which causes the optical assembly 230 to deform, thus impacting the performance of the optical module 220.

SUMMARY

Consistent with an embodiment in the present application, there is provided an optical module. The optical module includes: an optical assembly, including a light receiving assembly and/or a light transmitting assembly; a printed circuit board, on which the optical assembly is mounted; an adapter, used for docking with external connectors, the adapter being configured to fit the optical assembly and to be fixed to the printed circuit board, and the adapter including a metal part and a plastic part; and a conductive shell, used for accommodating the printed circuit board, the optical assembly, and the adapter, the conductive shell being electrically connected to the metal part of the adapter.

Consistent with another embodiment of the present application, there is provided an assembly method for an optical module in another embodiment of the present application. The assembly method includes: providing a printed circuit board, and mounting an optical assembly on the printed circuit board, the optical assembly including a light receiving assembly and/or a light transmitting assembly; forming an adapter by a process of insert molding, the adapter including a plastic part and a metal part and being used for docking with external connectors; securely installing the adapter and the printed circuit board using the optical assembly as a position reference; and securely installing a conductive shell to the outside of the printed circuit board to form the optical module. Compared to the prior art, the technical solutions provided by the present application are as follows:

DETAILED DESCRIPTION

Reference will now be made in detail to the present embodiments, examples of which are illustrated in the accompanying drawings. Wherever possible, the same reference numbers will be used throughout the drawings to refer to the same or like parts.

The text below provides detailed descriptions of embodiments of the present application as shown in the drawings. However, these embodiments do not limit the present application; the scope of protection for the present application covers changes made in terms of structure, method, or function by persons of ordinary skill in the art based on the embodiments.

In order to facilitate the presentation of the present application in the figures, the sizes of certain structures or parts have been enlarged relative to other structures or parts; as such, they are only for the purpose of illustrating the basic structure of the subject matter of the present application.

Terms in the text indicating relative spatial position, such as "upper," "above," "lower," "below," and so forth, are used for explanatory purposes in describing the relationship between a unit or feature depicted in the drawing with another unit or feature therein. Terms indicating relative spatial position can refer to positions other than those depicted in the figures when a device is being used or operated. For example, if the device shown in a figure is flipped over, a unit which is described as being located "below" or "under" another unit or feature will be located "above" the other unit or feature. Therefore, the exemplary term "below" can include positions both above and below. A device can be oriented in other ways (rotated 90 degrees or facing another direction); as such, descriptive spatially-related terms that appear in the text should be interpreted accordingly.

When an element or layer is said to be "above" another part or layer or "connected to" another part or layer, it may be directly above the other part or layer or directly connected to the other part or layer, or there may be an intermediate element(s) or layer(s).

FIGS. 3, 4a, 4b, and 5 illustrate an optical module 300 according to a first embodiment of the present application. The optical module 300 includes an optical assembly 310, a printed circuit board 320, an adaptor 330, and a conductive shell 340.

Figure 3:
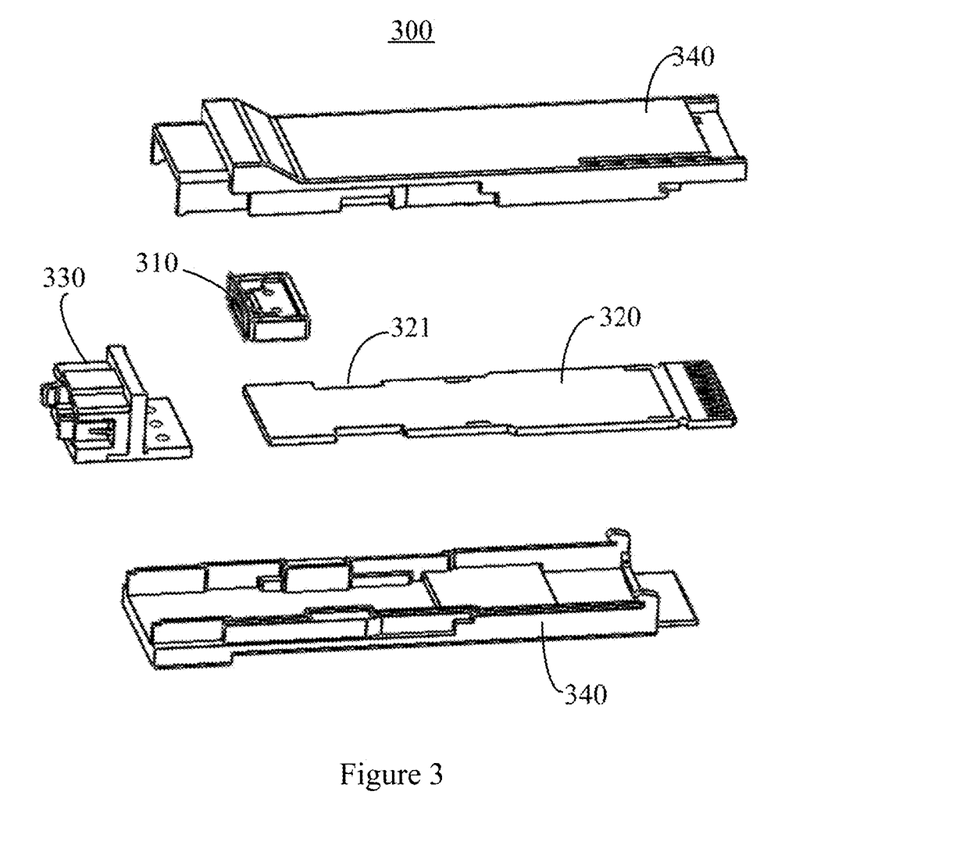
FIG. 3 is a schematic diagram showing an exploded view of an optical module according to a first embodiment of the present disclosure.

The optical assembly 310 can include a light receiving assembly and/or a light transmitting assembly.

The optical assembly 310 is mounted on the printed circuit board 320. The optical assembly 310 is electrically connected with the optical assembly 310.

The adapter 330 is used for docking with external connectors. The adapter 330 is configured to fit the optical assembly 310 and to be fixed to the printed circuit board 320. The adapter 330 includes a metal part 331 and a plastic part 332. The adapter 330 and the circuit board 320 are fixed by adhesion, welding, or other means.

The conductive shell 340 is used for accommodating the printed circuit board 320, the optical assembly 310, and the adapter 330. The conductive shell 340 is electrically connected to the metal part 331 of the adapter 330.

The light receiving assembly of the optical assembly 310 includes optical devices such as a light receiving component, a wavelength division multiplexing device, and a coupling lens. The light transmitting assembly of the optical assembly 310 includes optical devices such as a light transmitting component, a wavelength division multiplexing device, and a coupling lens. The optical devices in the optical assembly 310 are directly mounted on the printed circuit board 320 and need not be arranged by means of a flexible circuit board or fiber optic patch cord. The simplicity of the installation structure reduces manufacturing costs.

It should be understood that the optical assembly 310 in the optical module 300 of the present application is not limited to the optical devices as described in the embodiments mentioned above. Other optical devices such as reflective mirrors, circulators, and so forth may be added to the optical module in other embodiments.

Figure 4A:
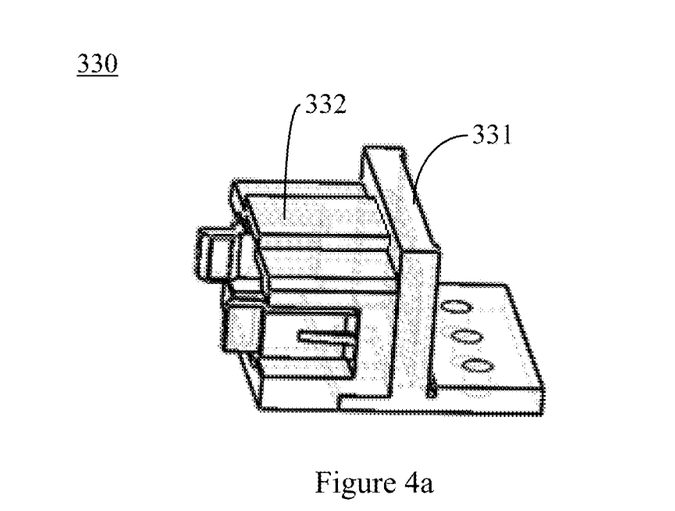
FIGS. 4a and 4b are schematic diagrams showing the 3D structure and an exploded view of an adapter in the first embodiment of the present disclosure.
Figure 4B:
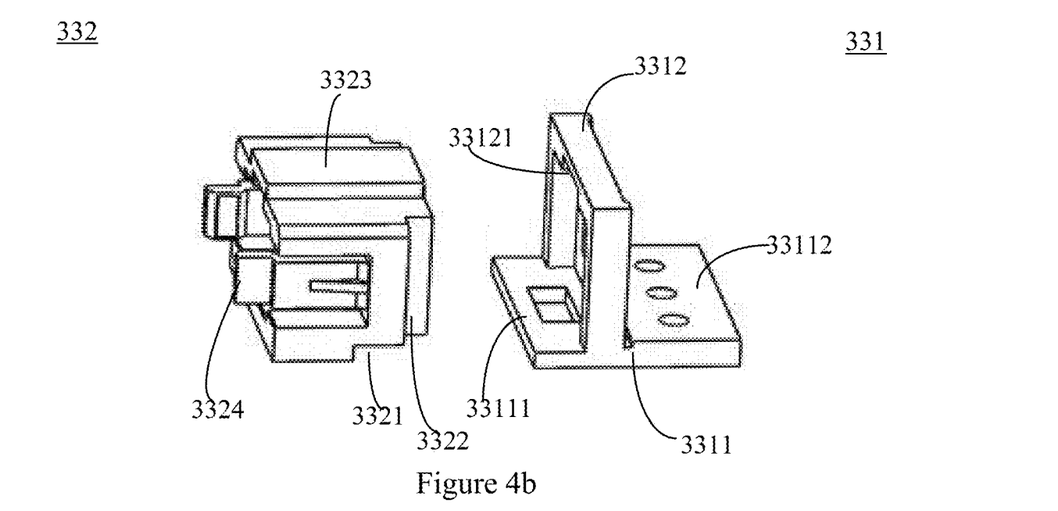

Referring to FIGS. 4a and 4b, the adapter 330 of the first embodiment includes a metal part 331 and a plastic part 332. The metal part 331 and the plastic part 332 are formed through a process of insert molding. The metal part 331 includes a metal base 3311 and a metal frame 3312 located on the metal base 3311. The metal frame 3312 is configured in an open door shape, i.e., a "⊓" shape in which a light-transmitting opening is surrounded by the metal frame 3312 and the metal base 3311. As shown in FIG. 4b, the shape of the metal frame 3312 has the "⊓" shape, which is a vertical rectangular shape without a bottom edge. The entirety of the metal base 3311 and the metal frame 3312 is electrically connected to the conductive shell 340.

Further, the metal base 3311 includes a first metal base 33111 and a second metal base 33112. A height of the first metal base 33111 is lower than a height of the second metal base 33112. The metal frame 3312 is secured on the first metal base 33111 and in a position adjacent to the second metal base 33112. The plastic part 332 is securely attached to the first metal base 33111 and the metal frame 3312. The upper surface of the second metal base 33112 is adhered securely to the lower surface of the printed circuit board 320. In addition, an accommodating groove 33121 is arranged on the inside of the metal frame 3312. A hollow portion of the metal frame 3312 is basically shaped as a "凸" and the accommodating groove 33121 is located at the top of the hollow portion on the inner side of the metal frame 3312. As shown in FIGS. 3, 4a, and 4b, the shape of the hollow portion has the "凸" shape consisting of a first lower rectangular portion and a second upper rectangular portion centered over the first portion, the first portion being larger than the second portion. For convenience, the hollow portion of the metal frame 3312 is referred to herein as an inverted "T" shape.

The plastic part 332 is used for docking with an external interface. The plastic part 332 is fixed on the metal base 3311. A portion of the plastic part 332 is accommodated inside the metal frame 3312. Specifically, a first limiting part 3321 that fits the metal base 3311 is provided at the bottom of the plastic part 332. Second limiting parts 3322 that fit the metal frame 3312 are provided at the sides of the plastic part 332. A longitudinally elongated protrusion 3323 that fits the accommodating groove 33121 inside the metal frame 3312 is provided at the top of the plastic part 332. One or more docking parts 3324 used for docking with external connectors are provided at the front end of the plastic part 332.

Therein, the entirety of the plastic part 332 in the first embodiment is made of plastic material. In other embodiments, the docking part 3324 may be the only portion made of plastic material, in which case the portion of the plastic part 332 excluding the docking part 3324 is made of metallic material or the plastic part 332 provides only the docking part 3324. Further, other embodiments may not provide the first limiting part 3321, the second limiting parts 3322, the protrusion 3323, and so forth.

The shape of the first limiting part 3321 corresponds to the shape of the first metal base 33111. The length of the first limiting part 3321 along an installation direction is equal to the length of the first metal base 33111 along the installation direction. The depth of the first limiting part 3321 is equal to the height of the first metal base 33111. Once the metal part and the plastic part are securely installed, the bottom of the plastic part and the bottom of the metal base will be situated on the same plane.

The shape of the second limiting part 3322 is configured to fit the metal frame 3312. The depth of the second limiting part 3322 along the installation direction is equal to the thickness of the metal frame 3312. Meanwhile, the shape of the protrusion 3323 at the top of the plastic part 332 corresponds to the shape of the accommodating groove 33121 inside the metal frame 3312. The hollow portion of the metal frame 3312 is basically shaped as an inverted "T", and the cross-section of the plastic part 332 forms an inverted "T" shape corresponding to the hollow portion of the metal frame 3312. The end of the plastic part 332 can be installed inside the metal frame 3312. Once the metal part 331 and the plastic part 332 are securely installed, the sides of the plastic part 332 and the sides of the metal frame 3312 are situated on the same planes. Meanwhile, the top end of the plastic part 332 is connected to the second metal base 33112.

The plastic part 332 in the present embodiment is formed by the process of insert molding. First, the metal part 331 is placed into a mold cavity. Then melted plastic material is injected into the mold cavity. The melted plastic material bonds with the metal part 331 and is solidified in the mold cavity by means of a preset plastic parts mold, thereby forming the integrated adapter 330. The installation strength of the plastic part 332 and the metal part 331 is ensured by fitting the first limiting part 3321, the second limiting part 3322, and the protrusion 3323 on the plastic part 332 with the corresponding first metal base 33111, metal frame 3312, and accommodating groove 33121 on the metal part 331.

Figure 5:
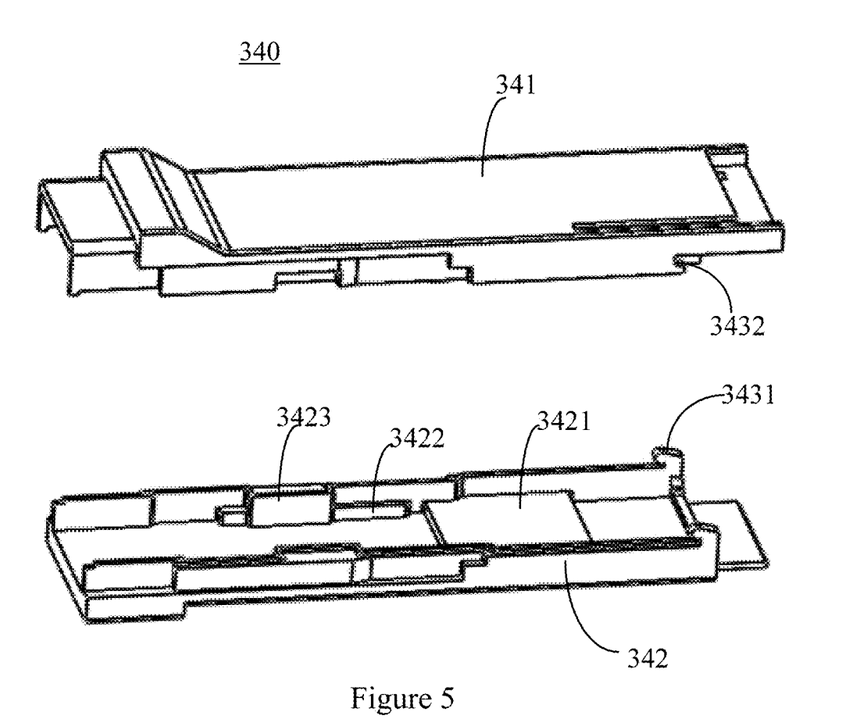
FIG. 5 is a schematic diagram showing an exploded view of a conductive shell in the first embodiment of the present disclosure.

Referring to FIG. 3 and FIG. 5. The conductive shell 340 in the first embodiment is made of metallic material. The conductive shell 340 includes a first conductive shell 341 and a second conductive shell 342 engaged with each other. A plurality of mutually corresponding fixing components are respectively provided on the first conductive shell 341 and the second conductive shell 342 to effect the engagement. The fixing components in the present embodiment include clips 3431 arranged on the second conductive shell 342 and clip slots 3432 arranged on the first conductive shell 341. Other fixing apparatuses may be provided in other embodiments.

The first conductive shell 341 and the second conductive shell 342 are securely installed to form an accommodating space to accommodate the adapter 330, the printed circuit board 320, and the optical assembly 310. The adapter 330 is situated at the end of the conductive shell 340, and the printed circuit board 320 is situated at the bottom of the conductive shell 340.

Specifically, a first supporting part 3421 and a plurality of second supporting parts 3422 are formed on the bottom surface of the second conductive shell 342. In addition, the second supporting parts 3422 are securely installed to the sides of the second conductive shell 342. The adapter 330 is situated at the end of the second conductive shell 342. In the present embodiment, the heights of the first supporting part 3421, the second supporting parts 3422, and the second metal base 33112 in the adapter 330 are equal, such that warping of the printed circuit board 320 during installation and use is prevented, thereby ensuring stability of the printed circuit board 320.

In addition, limiting parts 3423 are arranged on the sides of the second conductive shell 342. Limiting grooves 321 that fit the limiting parts 3423 are arranged on the sides of the printed circuit board 320 corresponding to the sides of the second conductive shell 342 on which the limiting parts 3423 are arranged. When the printed circuit board 320 is arranged inside the second conductive shell 342, the limiting parts 3423 and the limiting grooves 321 act as limits to ensure the installation placement of the printed circuit board 320, thereby improving the accuracy of installation of the printed circuit board 320.

The method for assembling the optical module 300 of the present embodiment includes the following steps.

First, the optical assembly 310 is mounted on the printed circuit board 320.

The adapter 330 is formed by the process of insert molding. The second metal base 33112 associated with the metal part 331 of the adapter 330 is secured to the lower surface on the end of the printed circuit board 320, and the adapter 330 and the printed circuit board 320 are securely installed using the optical assembly 310 as a position reference;

Finally, the first conductive shell 341 and the second conductive shell 342 are engaged to form the optical module 300.

It should be understood that the formation of the adapter 330 by the process of insert molding is a separate step in the assembly. As such, it may take place before or after the mounting of the optical assembly 310. In the assembly steps outlined above, it is also possible to begin by adhering and securing the printed circuit board 320 and the adapter 330, and then mounting the optical assembly 310 on the printed circuit board 320 using the adapter 330 as a position reference.

In the present embodiment, the bottom of the metal part 331 of the adapter 330 is electrically connected to the second conductive shell 342. Once securely installed, the first conductive shell 341 and the second conductive shell 342 can form a sealed metal chamber. The entire metal chamber has anti-electromagnetic interference (anti-EMI) properties, thus improving the electromagnetic shielding performance of the optical module 300 as a whole.

It should be understood that the printed circuit board 320 in the present embodiment can be an integrated rigid printed circuit board. In other embodiments, the printed circuit board 320 can include multiple electrically-connected flexible circuit boards and/or rigid circuit boards, e.g., PCBA circuit board 121 and flexible circuit board 122 as shown in FIGS. 1a and 1b. No further examples will be detailed here.

Figure 6:
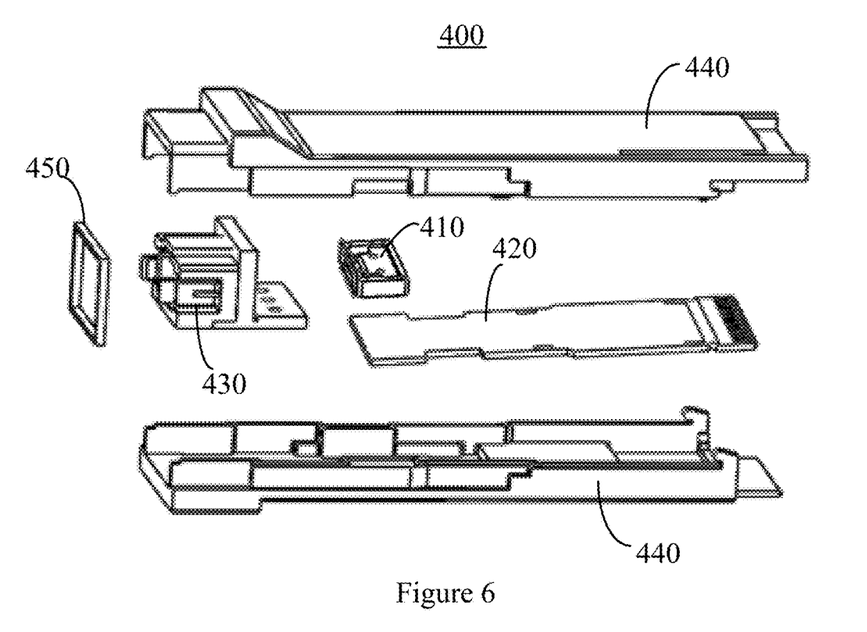
FIG. 6 is a schematic diagram showing an exploded view of an optical module in a second embodiment of the present disclosure.

FIG. 6 illustrates an optical module 400 according to a second embodiment of the present application. The optical module 400 includes an optical assembly 410, a printed circuit board assembly 420, an adaptor 430, a conductive shell 440, and an electromagnetic shielding device 450.

The optical assembly 410 includes a light receiving assembly and a light transmitting assembly.

The optical assembly is mounted on the printed circuit board 420. The printed circuit board 420 is electrically connected to the optical assembly 410.

The adapter 430 is used for docking with external connectors. The adapter 430 is configured to fit the optical assembly 410 and to be fixed with the printed circuit board 420. The adapter 430 includes a metal part and a plastic part.

The electromagnetic shielding device 450 is arranged on the outside of the adapter 430.

The conductive shell 440 is used for accommodating the printed circuit board 420, the optical assembly 410, the adapter 430, and the electromagnetic shielding device 450. The conductive shell 440 is electrically connected to the metal part of the adapter 430.

The structure and installation of the optical assembly 410, the printed circuit board 420, the adapter 430, and the conductive shell 440 in the second embodiment is identical to those in the first embodiment; as such, the description thereof will not be repeated here. Unlike the first embodiment, the second embodiment provides one or more electromagnetic shielding devices 450 added to the outside of the adapter 430. The electromagnetic shielding device 450 is made of one or more anti-EMI materials such as electrically conductive adhesive, conductive foam, and so forth, thereby further enhancing the electromagnetic shielding performance of the optical module 400. In addition, the electromagnetic shielding device 450 can produce a securing effect whereby the metal part and the plastic part are secured, thereby improving the stability of the adapter installation.

The optical devices in the optical assembly consistent with embodiments of the present application are mounted directly on the printed circuit board and need not be arranged by means of a flexible circuit board or fiber optic patch cord. The simplicity of the installation structure reduces manufacturing costs. The adapter is adhered directly to the printed circuit board, and the optical assembly is used as a position reference during installation, thus improving the accuracy of the adapter installation. The metal part of the adapter is electrically connected to the conductive shell, and the metal chamber formed by the conductive shell has anti-EMI properties, thus improving the electromagnetic shielding performance of the optical module as a whole. The electromagnetic shielding device is added to the outside of the adapter, thereby further enhancing the electromagnetic shielding performance of the optical module.

The present application offers the following beneficial effects through the embodiments described above:

The optical devices in the optical assembly of the present application are mounted directly on the printed circuit board and need not be arranged by means of a flexible circuit board or fiber optic patch cord. The simplicity of the installation structure reduces manufacturing costs.

The adapter is adhered directly to the printed circuit board, and the optical assembly is used as a position reference during installation, thus improving the accuracy of the adapter installation.

The metal part of the adapter is electrically connected to the conductive shell, and the metal chamber formed by the conductive shell has anti-EMI properties, thus improving the electromagnetic shielding performance of the optical module as a whole.

The electromagnetic shielding device is added to the outside of the adapter, thereby further enhancing the electromagnetic shielding performance of the optical module.

It should be understood that despite the descriptions of embodiments in the Specifications, there is not only one independent technical solution for each embodiment. The Specification is written this way simply for the sake of clarity. Those skilled in the art should treat the Specification as a whole; the technical solutions associated with the embodiments may be combined in appropriate ways to form other embodiments that can be understood by those skilled in the art.

The series of detailed descriptions above is only intended to provide specific descriptions of feasible embodiments of the present application. The detailed descriptions are not to be construed as limiting the scope of protection for the present application; all equivalent embodiments or changes that are not detached from the techniques of the present application in essence should fall under the scope of protection of the present application.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical module, comprising:
    an optical assembly, including at least one of a light receiving assembly or a light transmitting assembly;
    a printed circuit board, on which the optical assembly is mounted;
    an adapter, used for docking with external connectors, wherein the adapter is configured to fit the optical assembly and to be fixed to the printed circuit board, the adapter including a metal part; and
    a conductive shell, for receiving the printed circuit board, the optical assembly, and the adapter, the conductive shell being electrically connected to the metal part of the adapter,
    wherein the metal part includes a metal base and a metal frame located on the metal base,
    a light-transmitting opening is surrounded by the metal frame and the metal base, and
    the entirety or portions of the metal base and metal frame are electrically connected to the conductive shell.

2. The optical module according to claim 1, wherein the adapter further includes a plastic part,
    the metal base includes a first metal base and a second metal base,
    a height of the first metal base is lower than a height of the second metal base,
    the metal frame is secured on the first metal base,
    the plastic part is securely attached to the first metal base and the metal frame, and
    the second metal base is securely adhered to the printed circuit board.

3. The optical module according to claim 1, wherein the adapter further includes a plastic part,
    the plastic part is fixed on the metal base,
    a plurality of docking parts used for docking with external connectors are arranged on a front end of the plastic part, and
    the docking parts are made of plastic material.

4. The optical module according to claim 3, wherein the plastic part is partially received within the metal frame,
    a first limiting part that fits the metal base is provided at a bottom of the plastic part, and
    second limiting parts that fit the metal frame are provided at sides of the plastic part.

5. The optical module according to claim 4, wherein when the metal part and the plastic part are securely installed, the bottom of the plastic part and a bottom of the metal base are situated on the same plane, and the sides of the plastic part and sides of the metal frame are situated on the same plane.

6. The optical module according to claim 1, wherein the adapter further includes a plastic part,
    a longitudinally elongated protrusion is arranged at the top of the plastic part,
    a groove is arranged on the inside of the metal frame, and
    when the plastic part and metal part are installed, the protrusion and the groove are fitted to each other.

7. The optical module according to claim 1, wherein the adapter further includes a plastic part, and
    the adapter is formed from the metal part and the plastic part by a process of insert molding.

8. The optical module according to claim 1, wherein one or multiple electromagnetic shielding devices are arranged on the outside of the adapter.

9. The optical module according to claim 1, wherein a plurality of supporting parts of equal height are arranged on a bottom surface of the conductive shell, and the printed circuit board is securely installed on the supporting parts on the bottom surface of the conductive shell.

10. The optical module according to claim 1, wherein limiting parts and limiting grooves that fit each other are arranged on corresponding sides of the conductive shell and the printed circuit board, respectively.

11. An assembly method for an optical module, comprising:

providing a printed circuit board, and mounting an optical assembly on the printed circuit board, the optical assembly including at least one of a light receiving assembly or a light transmitting assembly;

forming an adapter by a process of insert molding, the adapter including a metal part and being used for docking with external connectors;

fixing the adapter to the printed circuit board using the optical assembly as a position reference; and installing a conductive shell to an outside of the printed circuit board to form the optical module, wherein the metal part includes a metal base and a metal frame located on the metal base, a light-transmitting opening is surrounded by the metal frame and the metal base, and the entirety or portions of the metal base and metal frame are electrically connected to the conductive shell.

12. The assembly method of claim 11, wherein the adapter further includes a plastic part.

13. The optical module of claim 1, wherein the printed circuit board is rigid, and includes a finger-shaped structure at one end of the printed circuit board.

\* \* \* \* \*